United States Patent Office 2,728,725
Patented Dec. 27, 1955

2,728,725
WATER CLARIFICATION USING WATER-SOLUBLE CELLULOSE DERIVATIVE CO-AGULATION AID

Walter E. Gloor, Wilmington, Del., assignor to Hercules Powder Company, Wilmington, Del., a corporation of Delaware No Drawing. Application November 29, 1951, Serial No. 259,020

11 Claims. (Cl. 210—23)

This invention relates to a process for the purification and clarification of water. In a specific aspect this invention relates to a process for removing contaminating materials from water by coagulation. In a more specific aspect this invention relates to an improved coagulation process for the removal of contaminants from water wherein a novel coagulant aid is employed.

This application is a continuation-in-part of the copending application, Serial No. 218,531, filed March 30, 1951, now abandoned.

The removal of contaminating materials from water represents an important problem in the purification and clarification of both potable and industrial waters, and it is also an important problem in the treatment of sewage and industrial wastes. Various methods are used for the eradication of contaminants from water, and in these methods coagulation procedures are rather extensively employed, particularly for the removal of turbidity and color bodies which are present as a suspension of finely-divided particles. Also, coagulation procedures remove a large proportion of the bacteria from contaminated water. Coagulation procedures depend upon the use of compounds, known as coagulants, to remove turbidity, color bodies and bacteria from contaminated water by the formation of a floc in the water. As the floc settles out of the water or as it is removed by some other means, it removes contaminants from the water, and in this manner the water is purified and clarified.

The desired goal in a coagulation procedure is to obtain the maximum degree of clarification with a minimum expenditure for coagulants and treatment facilities. It is desirable that the floc settle relatively rapidly. It is also desirable that the floc be relatively tough in order that it will not break up or disintegrate into small particles while the water containing it is being conveyed to a filter bed or other separation means. It is also desirable that the addition of the coagulant be effective for the removal of the contaminants with the use of a minimum amount of coagulant.

It is an object of this invention to provide a novel and improved process for the purification and clarification of contaminated water.

It is another object of this invention to provide a novel and improved process for the removal of contaminants from water by coagulation.

It is a further object of this invention to provide novel and improved coagulant aids for the removal of contaminants from water by coagulation.

Further and additional objects of this invention will be apparent from the ensuing detailed disclosure.

In accordance with this invention it has been found that the above objects and purposes can be achieved by the addition of a water-soluble cellulose derivative to a contaminated water that is being purified by a coagulation process. The presence of the cellulose derivative causes the floc to settle more rapidly; the floc produced in the presence of the cellulose derivative is relatively difficultly disintegrated; and to obtain the desired clarification the presence of the cellulose derivative as a coagulant aid makes it possible to use considerably smaller quantities of coagulant.

The invention can be fully understood by referring to the following specific examples which demonstrate the advantages of employing water-soluble cellulose derivatives as coagulant aids. In the various examples p. p. m. represents parts by weight per million parts by weight of water.

Example 1

Water-soluble hydroxyethyl cellulose (HEC) having a degree of substitution of 1.36 was added in the form of an aqueous solution to contaminated water to which 15 p. p. m. of alum was also added as a coagulant. The following data were observed:

| p.p.m. HEC | Percent Floc Settled in— | | | |
|---|---|---|---|---|
| | 5 min. | 30 min. | 60 min. | 120 min. |
| 0 | 2 | 40 | 65 | 80 |
| 0.5 | 10 | 65 | 75 | 90 |

In additional runs the alum was replaced by 10 p. p. m. of ferric sulfate, and the following data were observed:

| p.p.m. HEC | Percent Floc Settled in— | | | |
|---|---|---|---|---|
| | 5 min. | 30 min. | 60 min. | 120 min. |
| 0 | 10 | 40 | 65 | 85 |
| 0.5 | 10 | 55 | 75 | 90 |

Example 2

Water-soluble sodium carboxymethylcellulose (CMC) having a degree of substitution of 0.7 was added in the form of an aqueous solution to contaminated water to which 27.5 p. p. m. of alum was also added as a coagulant. The following data were observed:

| p.p.m. CMC | Percent Floc Settled in— | | | | |
|---|---|---|---|---|---|
| | 5 min. | 15 min. | 30 min. | 60 min. | 120 min. |
| 0 | 5 | 7 | 15 | 30 | 55 |
| 1 | 10 | 60 | 70 | 80 | 90 |
| 2 | 10 | 55 | 75 | 90 | 95 |
| 4 | 15 | 50 | 75 | 85 | 95 |

Example 3

Water-soluble sodium cellulose sulfate having a degree of substitution of 0.37 was added in the form of an aqueous solution to contaminated water to which 15 p. p. m. of alum was also added as a coagulant. The following data were observed:

| p.p.m. Cellulose Sulfate | Percent Floc Settled in— | | | |
|---|---|---|---|---|
| | 5 min. | 30 min. | 60 min. | 120 min. |
| 0 | 7 | 33 | 50 | 80 |
| 1 | 10 | 50 | 65 | 92 |

Example 4

Water-soluble methyl cellulose having a viscosity of 400 cps. was added in the form of an aqueous solution to contaminated water to which 15 p. p. m. of alum was also added as a coagulant. The following data were observed:

| p.p.m. Methyl Cellulose | Percent Floc Settled in— | | | |
|---|---|---|---|---|
| | 5 min. | 30 min. | 60 min. | 120 min. |
| 0 | 7 | 33 | 50 | 80 |
| 1 | 12 | 65 | 80 | 94 |

The above examples clearly point out desirable features of the invention as well as its utility. For example, one of the outstanding features of this invention is shown by a comparison of the data in Example 2. The water that was purified in each of the runs of this example was taken from the same source. If we compare the data in these runs, we note that in a given period of time the presence of the cellulose derivative improves upon the percentage of the floc that settles out of the water. Also, as a corollary, by the use of the cellulose derivative it is possible to decrease the period of time necessary for a given amount of floc to settle out when compared with runs using no coagulant aid.

The cellulose derivatives of this invention are water-soluble, and typical examples of cellulose derivatives that can be used are hydroxyalkyl celluloses, such as hydroxyethyl cellulose and the like, the free acid form of carboxyalkyl celluloses, such as carboxymethylcellulose and the like, salts of carboxyalkyl celluloses, such as the alkali metal, ammonium, amine, magnesium salts of carboxymethylcellulose, and the like, sulfoalkyl celluloses, such as sulfoethyl cellulose and the like, alkyl celluloses, such as methyl cellulose and the like, alkyl hydroxyalkyl celluloses, such as ethyl hydroxyethyl cellulose and the like, the free acid form of cellulose sulfate, and salts of cellulose sulfate, such as alkali metal, ammonium, amine, magnesium salts, and the like. The term "water-soluble" is intended to mean that the cellulosic derivatives form colloidal solutions in water. The term "water-soluble" is well known and commonly used in the art of cellulosic derivatives, and the water solubility of a cellulosic derivative is readily determinable by admixing the derivative with water, and then noting whether the derivative enters into solution with the water. In most instances the solubility characteristics of a cellulose derivative are determined by the degree of substitution or number of substituents per anhydroglucose unit. However, the solubility characteristics of a cellulose derivative of a given degree of substitution are subject to variation and dependent upon such factors as the uniformity of substitution, the method of preparation, and the like. It will be understood that the cellulose derivatives of this invention possess the necessary degree of substitution and/or are prepared in the necessary manner to impart water solubility to the derivative. Sodium carboxymethylcellulose having a degree of substitution below 0.35 is regarded as water-insoluble, and at a degree of substitution of 0.35 this derivative becomes partially water-soluble. Its water solubility increases as the degree of substitution increases, and at a degree of substitution of about 0.4 to 0.5 this derivative becomes completely water-soluble. Similarly, sodium sulfoethyl cellulose having a degree of substitution below about 0.28 to 0.3 is regarded as water-insoluble, and at higher degrees of substitution this derivative can be regarded as water-soluble. The above specific examples set forth degrees of substitution at which various cellulose derivatives are water-soluble. The cellulose derivatives in those specific examples can be prepared by any of the known procedures for their preparation.

The hydroxyethyl cellulose that is employed as a coagulant aid in accordance with this invention is water-soluble, and it can be produced by various methods. One of these methods of producing hydroxyethyl cellulose involves the etherification of an alkali cellulose with ethylene chlorohydrin in the presence of caustic alkali. A detailed method of producing hydroxyethyl cellulose in this manner is described by Dreyfus in his patent, U. S. 1,502,379. Another method of producing hydroxyethyl cellulose involves the interaction of ethylene oxide and cellulose in the presence of aqueous caustic alkali. Either of these methods or any other method known in the art can be employed to produce the hydroxyethyl cellulose that is used to practice this invention. Water-soluble hydroxyethyl cellulose contains more than 0.8, but usually not more than 2, hydroxyethyl substituents per anhydroglucose unit. These values can also be referred to as the degree of substitution. The hydroxyethyl cellulose that was employed in the above specific examples contained 1.36 hydroxyethyl substituents per anhydroglucose unit. However, it will be recognized that hydroxyethyl cellulose having a greater or lesser degree of substitution can be used in practicing this invention.

As already described, the cellulose derivatives are employed as coagulant aids and in accordance with the above discussion the cellulose derivatives improve upon and hasten the coagulation. Various known coagulants can be employed in carrying out the process. Alum or commercial aluminum sulfate is quite generally used as a coagulant, and it represents the preferred coagulant for this process. It is available commercially, and it is ordinarily represented by the formula $Al_2(SO_4)_3 \cdot 18H_2O$. In addition to alum, any of the other known coagulants may be employed. Among these other coagulants are ferric sulfate, ferric chloride, sodium aluminate, lime-soda water softeners, and the like. Any of these known coagulants are quite effective for purifying and clarifying contaminated water, and the cellulose derivatives of this invention can be used to improve upon such coagulation. Also, in coagulation processes it is sometimes necessary to adjust the pH of the water to a desirable pH for flocculation when a particular coagulant is employed. Such pH adjustment is made by addition of either acidic compounds, such as a strong mineral acid, or basic compounds, such as sodium carbonate, lime or caustic, to the water, and the use of such compounds in the coagulation process is within the scope of this invention.

The amount of cellulose derivative that is employed in carrying out this invention is quite variable. The above specific examples demonstrate that a concentration of either 0.5 or 1 part per million parts of water is effective, but, if desired, lower concentrations can be used. The maximum concentration employed in the specific examples was 10 parts per million parts of water, and as the examples show, this concentration was also effective. It will be understood that greater concentrations can be used if desired. However, greater concentrations are not necessary, and for purposes of economy they are not preferred. A concentration within the range of 0.1 to 10, preferably 0.5 to 5, parts by weight per million parts by weight of water is generally suitable for effecting this invention. It will of course be understood that concentrations outside this range can be used without departing from the spirit and scope of the invention.

The cellulose derivative can be added to the contaminated water by various methods. For example, it can be added in the form of a dry powder. On the other hand, the cellulose derivative can be added in the form of an aqueous solution. This latter method represents the preferred method of introduction to the contaminated water since it is more convenient to handle the cellulose derivative in the solution form than in the dry powder form, and it is also easier to add the desired amount of cellulose derivative to the water when it is in the form of a solution rather than in the form of a dry powder. It is also within the scope of this invention to add the cellulose derivative to the contaminated water at various times during the coagulation process. For example, the cellulose derivative can be added to the water prior to the introduction of the coagulant. Similarly, if desired, it can be added to the water after the introduction of coagulant, and alternatively, the cellulose derivative can be added to the water at the same time the coagulant is added thereto. It is preferred to add the cellulose derivative to the contaminated water after addition of the coagulant and adequate pH adjustment since improved floc settling and water clarification are obtained in this manner.

In order to insure the desired clarification of the contaminated water it is necessary to obtain adequate contacting of the water, the coagulant and the coagulant aid, and such contacting is usually obtained by agitation of the mixture. Length of the period of agitation is dependent upon several variables, such as the design of the equipment, the clarification desired, the coagulant and coagulant aid employed, the amount of coagulant and coagulant aid used, and the like. In the specific examples the period varied from 30 to 45 minutes. The preferred period varies from 30 to 60 minutes, but in some instances the desired clarification is obtained in a period of about 10 minutes. Obviously, longer and shorter periods can be used within the scope of this invention.

The cellulose derivatives of this invention are effective coagulant aids for purifying or clarifying contaminated water in the vertical hydrotreater type of equipment such as the Spaulding Precipitator. This type of equipment makes maximum use of the cellulose derivatives by retaining the derivatives in the treating zone for a suitable period of time. Also, these hydrotreaters are rather critical in their operation, and the cellulose derivatives tend to stabilize the operation.

The cellulose derivatives of this invention can be used as coagulant aids either singly or in combination with any of the other cellulose derivatives described above as coagulant aids. Also, the cellulose derivatives can be used in some instances in combination with other noncellulosic coagulant aids, for example, polyvinyl acetate.

Various advantages accrue from the use of cellulose derivatives as coagulant aids in the clarification of water. One of the foremost advantages is the production of a floc which settles faster when a cellulose derivative is employed with the coagulant as compared with those methods where no cellulose derivative is used. This advantage is particularly important since it makes it possible either to increase the amount of contaminated water undergoing treatment or to treat a given quantity of water in a shorter period of time when a cellulose derivative is used, and thus the economy of the clarification operation is greatly improved. Also, the use of the cellulose derivative results in the production of a tougher, relatively difficulty disintegrated floc. This advantage is of importance when the water containing the floc is conveyed to a filter bed or other separation means. The floc tends to remain in an integrated form and as such it is readily separable from the water. Also, by use of a cellulose derivative it is possible to employ a lesser amount of coagulant to effect a desired clarification of the water. This advantage is also economically desirable. It is also obvious that by reducing the amount of coagulant, the content of dissolved solids and the conductivity of the treated water are reduced, making the water of better quality for numerous commercial uses. With some waters, use of the cellulose derivatives with the usual coagulants improves the taste of the water, reducing or eliminating its astringent quality. Further and additional advantages of this process and alternative methods of operation within the scope of the invention will be obvious from the discussion above.

What I claim and desire to protect by Letters Patent is:

1. In a process for decreasing the turbidity of water wherein a coagulating agent selected from the group consisting of aluminum sulfate and ferric sulfate is employed to form a floc which removes suspended matter causing said turbidity from the water being treated, the improvement which comprises dissolving in said water a water-soluble substituted cellulose ether and contacting said water and coagulating agent with said cellulose ether to hasten the settling of said floc in the process, said cellulose ether being employed in an amount within the range of 0.1 to 10 parts by weight per million parts of water, and settling floc formed in said process from water thus treated.

2. In a process for decreasing the turbidity of water wherein a coagulating agent selected from the group consisting of aluminum sulfate and ferric sulfate is employed to form a floc which removes suspended matter causing said turbidity from the water being treated, the improvement which comprises dissolving in said water a water-soluble salt of a carboxyalkyl cellulose ether and contacting said water and coagulating agent with said cellulose ether to hasten the settling of said floc in the process, said cellulose ether being employed in an amount within the range of 0.1 to 10 parts by weight per million parts of water, and settling floc formed in said process from water thus treated.

3. The process according to claim 2 wherein the salt of a carboxyalkyl cellulose ether is the sodium salt of carboxymethylcellulose.

4. In a process for decreasing the turbidity of water wherein a coagulating agent selected from the group consisting of aluminum sulfate and ferric sulfate is employed to form a floc which removes suspended matter causing turbidity from the water being treated, the improvement which comprises dissolving in said water a water-soluble salt of a sulfoalkyl cellulose ether and contacting said water and coagulating agent with said cellulose ether to hasten the settling of said floc in the process, said cellulose ether being employed in an amount within the range of 0.1 to 10 parts by weight per million parts of water, and settling floc formed in said process from water thus treated.

5. The process according to claim 4 wherein the salt of a sulfoalkyl cellulose is the sodium salt of sulfoethyl cellulose.

6. In a process for decreasing the turbidity of water wherein a coagulating agent selected from the group consisting of aluminum sulfate and ferric sulfate is employed to form a floc which removes suspended matter causing said turbidity from the water being treated, the improvement which comprises dissolving in said water a water-soluble alkyl cellulose ether and contacting said water and coagulating agent with said cellulose ether to hasten the settling of said floc in the process, said cellulose ether being employed in an amount within the range of 0.1 to 10 parts by weight per million parts of water, and settling floc formed in said process from water thus treated.

7. The process according to claim 6 wherein the alkyl cellulose is methyl cellulose.

8. In a process for decreasing the turbidity of water wherein a coagulating agent selected from the group consisting of aluminum sulfate and ferric sulfate is employed to form a floc which removes suspended matter causing said turbidity from the water being treated, the improvement which comprises dissolving in said water a water-soluble salt of cellulose sulfate and contacting said water and coagulating agent with said water-soluble salt to hasten the settling of said floc in the process, said water-soluble salt being employed in an amount within the range of 0.1 to 10 parts by weight per million parts of water, and settling floc formed in said process from water thus treated.

9. In a process for decreasing the turbidity of water wherein a coagulating agent selected from the group consisting of aluminum sulfate and ferric sulfate is employed to form a floc which removes suspended matter causing said turbidity from the water being treated, the improvement which comprises dissolving in said water a water-soluble hydroxyalkyl cellulose ether and contacting said water and coagulating agent with said cellulose ether to hasten the settling of said floc in the process, said cellulose ether being employed in an amount within the range of 0.1 to 10 parts by weight per million parts of water, and settling floc formed in said process from water thus treated.

10. The process according to claim 9 wherein the hydroxyalkyl cellulose is hydroxyethyl cellulose.

11. In a process for decreasing the turbidity of water wherein aluminum sulfate is employed as a coagulating agent to form a floc which removes suspended matter causing said turbidity from the water being treated, the improvement which comprises dissolving in said water a water-soluble hydroxyethyl cellulose containing more than 0.8 but not more than 2 hydroxyethyl substituents per anhydroglucose unit and contacting said water and aluminum sulfate with said hydroxyethyl cellulose to hasten the settling of said floc in the process, said hydroxyethyl cellulose being employed in an amount within the range of 0.1 to 10 parts by weight per million parts of water, and settling floc formed in said process from water thus treated.

References Cited in the file of this patent

UNITED STATES PATENTS

| | | |
|---|---|---|
| 1,337,673 | Wall | Apr. 20, 1920 |
| 1,777,546 | Blumenberg | Oct. 7, 1930 |
| 2,033,481 | Richter | Mar. 10, 1936 |
| 2,236,545 | Maxwell et al. | Apr. 1, 1941 |
| 2,351,259 | Fuetterer | June 23, 1944 |
| 2,580,351 | Grassie | Dec. 25, 1951 |

OTHER REFERENCES

Lange: Handbook of Chemistry, 7th ed., 1949, pp. 780–81, Handbook Publ. Inc., Sandusky, Ohio.

Gloor et al.: Ind. & Eng. Chem., vol. 42, No. 10, pp. 2150–3, Oct. 1950.

Flocculation as an Aid in the Clarification of Coal Washery Water, Bureau of Mines, R. I. 3494, pp. 9–11, Feb. 1940.

Am. Dyestuff Reporter, vol. 35, pp. 304–5, 1946.